United States Patent
Bridges et al.

(10) Patent No.: US 7,805,588 B2
(45) Date of Patent: Sep. 28, 2010

(54) CACHING MEMORY ATTRIBUTE INDICATORS WITH CACHED MEMORY DATA FIELD

(75) Inventors: Jeffrey Todd Bridges, Raleigh, NC (US); James Norris Dieffenderfer, Apex, NC (US); Thomas Sartorius, Raleigh, NC (US); Brian Michael Stempel, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 11/254,873

(22) Filed: Oct. 20, 2005

(65) Prior Publication Data

US 2007/0094475 A1 Apr. 26, 2007

(51) Int. Cl.
*G06F 12/00* (2006.01)
(52) U.S. Cl. .................. 711/207; 711/3; 711/138; 711/144; 711/206
(58) Field of Classification Search ............ 711/3, 711/138, 144, 206–207
See application file for complete search history.

(56) References Cited

U.S. PATENT DOCUMENTS

| 5,689,679 | A  |   | 11/1997 | Jouppi |          |
|-----------|----|---|---------|--------|----------|
| 5,717,898 | A  | * | 2/1998  | Kagan et al. | 711/145 |
| 6,574,708 | B2 | * | 6/2003  | Hayter et al. | 711/118 |
| 6,711,653 | B1 | * | 3/2004  | Quach et al. | 711/146 |
| 7,089,397 | B1 | * | 8/2006  | Anvin et al. | 711/207 |
| 2006/0184804 | A1 | * | 8/2006 | Varma et al. | 713/193 |
| 2006/0282645 | A1 | * | 12/2006 | Tsien | 711/207 |

OTHER PUBLICATIONS

Cekleov M et al: "Virtual-Address Caches. Part 1: Problems and Solutions in Uniprocessors" IEEE Micro, IEEE Service Center, Los Alamitos, CA, US, vol. 17, No. 5 Sep. 1997, pp. 64-71.
Frink C R et al: "The Cache Architecture of the Apollo DN4000" Intellectual Leverage. San Francisco, Feb. 29-Mar. 4, 1988, Computer Society International Conference. (Compcon), Wasington, IEEE Comp. Soc. Press, US, vol. Conf. 33, Feb. 29, 1998, pp. 300-302.
International Preliminary Report on Patentability-PCT/US06/060135, The International Bureau of WIPO, Geneva-Switzerland-Apr. 23, 2008.
International Search Report-PCT/US06/060135, International Search Authority-European Patent Office-Apr. 3, 2007.
Written Opinion-PCT/US06/060135, International Search Authority-European Patent Office-Apr. 3, 2007.

* cited by examiner

*Primary Examiner*—Jasmine Song
(74) *Attorney, Agent, or Firm*—Peter M. Kamarchik; Nicholas J. Pauley; Sam Talpalatsky

(57) ABSTRACT

A processing system may include a memory configured to store data in a plurality of pages, a TLB, and a memory cache including a plurality of cache lines. Each page in the memory may include a plurality of lines of memory. The memory cache may permit, when a virtual address is presented to the cache, a matching cache line to be identified from the plurality of cache lines, the matching cache line having a matching address that matches the virtual address. The memory cache may be configured to permit one or more page attributes of a page located at the matching address to be retrieved from the memory cache and not from the TLB, by further storing in each one of the cache lines a page attribute of the line of data stored in the cache line.

26 Claims, 5 Drawing Sheets

CACHING MEMORY ATTRIBUTE INDICATORS WITH CACHED MEMORY DATA FIELD

The present invention relates to caches.

BACKGROUND

In a processing system that supports paged virtual memory, data may be specified using virtual addresses (also referred to as "effective" or "linear" addresses) that occupy a virtual address space of the processing system. The virtual address space may typically be larger than the size of the actual physical memory in the system. The operating system in the processing system may manage the physical memory in fixed size blocks called pages.

To translate virtual page addresses into physical page addresses, the processing system may search page tables stored in the system memory, which may contain the necessary address translation information. A page table may typically be rather large in size, since it may contain a list of all the physical page addresses for all the virtual page addresses generated by the processing system. Also, page table searches (or "page table walks") may involve memory accesses, which may be time-consuming.

The processing system may therefore perform address translation using one or more translation lookaside buffers (TLBs), which may typically contain a subset of the entries in the page table. A TLB is an address translation cache, i.e. a small cache that stores recent mappings from virtual addresses to physical addresses. The processing system may cache a physical address in the TLB, after performing a page table search and an address translation. A TLB may typically contain a plurality of TLB entries, each TLB entry containing a virtual page address and a corresponding physical page address.

When a TLB receives a virtual page address, the TLB may search its entries to see if any of the cached virtual page addresses in any of these entries match the received virtual page address. If the virtual page address presented to a TLB does match a virtual page address stored in any of the TLB entries, a TLB "hit" may occur; otherwise, a TLB "miss" may occur. Because each TLB lookup consumes power and computer time, reducing the frequency of TLB accesses may be desirable.

A TLB may also store information regarding one or more memory attributes, in addition to information about virtual-to-physical address translations. These memory attributes may, for example, include protection characteristics of memory entries, such as read/write/execute permissions. The memory attributes cached in a TLB may be accessed before, or in parallel with, the access to the memory cache.

Storing these memory attributes in the TLB, in addition to storing virtual-to-physical address translation information, may increase the number of bits required to be cached in each TLB entry. The more bits that have to be accessed, the slower the lookup in the TLB becomes, and the more power it consumes.

SUMMARY

A processing system may include a memory configured to store data in a plurality of pages, each page having a plurality of lines. The processing system may further include a translation lookaside buffer (TLB), and a memory cache including a plurality of cache lines. Each one of the cache lines may be configured to store an address of one of the lines of memory, and to store a line of data located at the address. The memory cache may be configured to permit, when a virtual address is presented to the cache, a matching cache line to be identified from the plurality of cache lines, the matching cache line having a matching address that matches the virtual address presented to the memory cache. The memory cache may be configured to permit a page attribute of a page located at the matching address to be retrieved from the memory cache without accessing the TLB in order to retrieve the page attribute, by further storing in each one of the cache lines a page attribute of the line of data stored in the cache line.

A method may include accessing a memory cache using a virtual address of a line of data. The method may further include retrieving from the memory cache a page attribute for the line of data, without accessing the TLB to retrieve the page attribute.

DETAILED DESCRIPTION

The detailed description set forth below in connection with the appended drawings is intended to describe various embodiments of a processing system, but is not intended to represent the only possible embodiments. The detailed description includes specific details, in order to permit a thorough understanding of what is described. It should be appreciated by those skilled in the art, however, these specific details may not be included in some of the embodiments of the processing system. In some instances, well-known structures and components are shown in block diagram form, in order to more clearly illustrate the concepts that are being explained.

Figure 1:
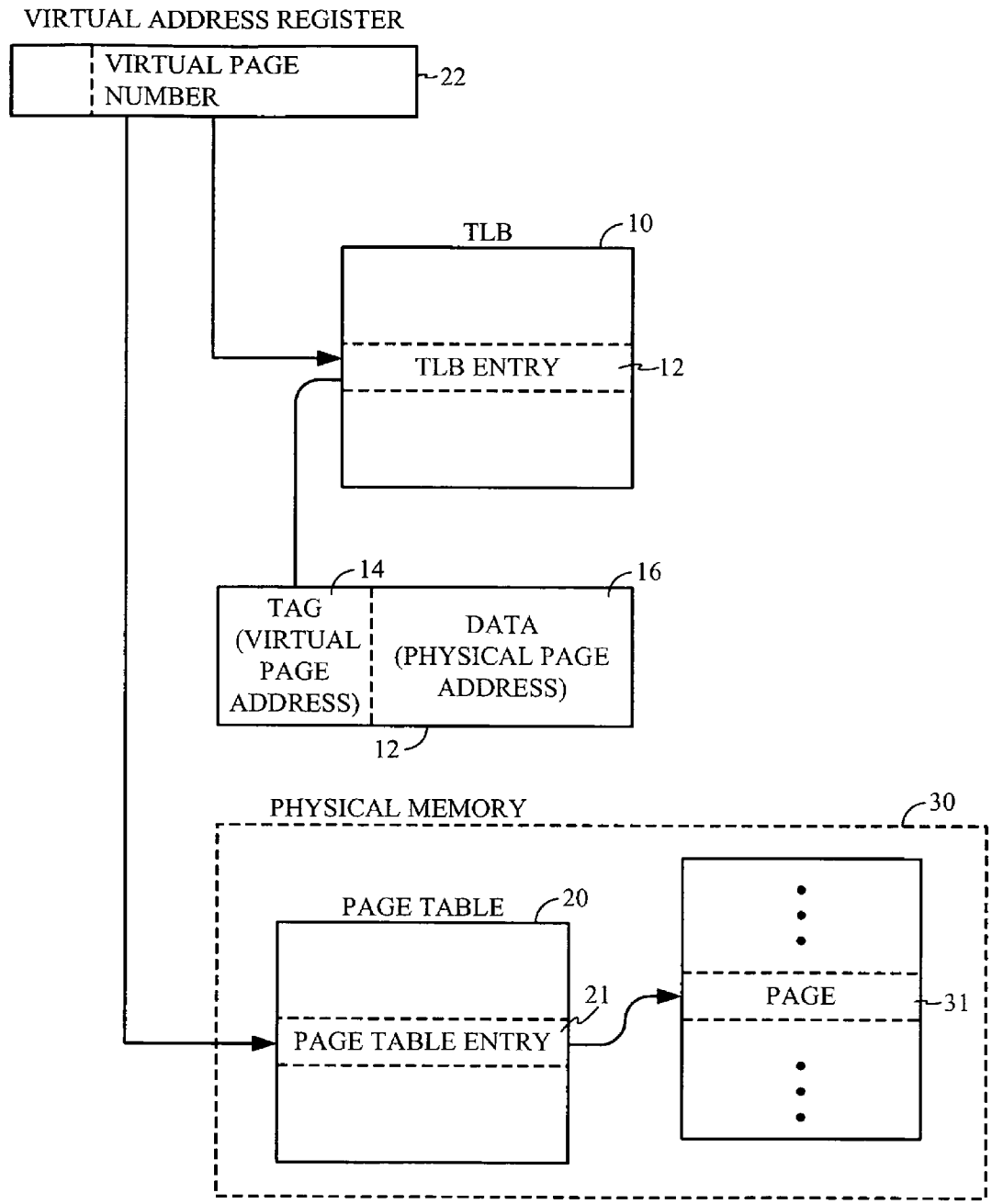
FIG. 1 illustrates a translational look-aside buffer (TLB) in the context of a virtual memory system.

FIG. 1 schematically illustrates a translation look-aside buffer (TLB) 10 in the context of a virtual memory system that includes a physical memory 30 and a page table 20. In virtual memory systems mappings (or translations) may typically be performed between a virtual (or "linear") address space of a computer (referring to the set of all virtual addresses generated by the computer) and a physical address space of the computer memory. The physical address of a piece of data indicates the actual location within the physical memory 30 of the piece of data, and may be provided on a memory bus to write to or read from the particular location in the physical memory 30.

In a paged virtual memory system, the data may be viewed as being grouped into fixed-length blocks of memory commonly referred to as pages 31. For example, if the smallest addressable unit of memory is a byte, and a set of sequential addresses refers to a set of sequential memory bytes, then a page may be defined as a block of sequential memory bytes that are comprised of a particular number of bytes. Pages may be composed of a number of bytes that is a power of two (e.g. $2^{12}$=4096 bytes, or 4 KB). Pages may be located in the memory so that the beginning of each page is "aligned" to the page size, that is, the address of the first byte in the page may be evenly divisible by the number of bytes that comprise the page. Thus, if the size of the pages is $2^N$ bytes, then the low-order N bits of the page address (i.e. the address of the first byte in the page) may always be zeros. The remaining bits in the address, i.e. the most significant bits, may be referred to as the "page number."

Both the virtual address space and the physical address space may be divided into pages, and mapping virtual addresses into physical addresses may be accomplished by mapping the virtual page number to the physical page number, and concatenating the low-order N bits of the virtual address to the physical page number. That is, corresponding virtual and physical byte addresses may always have the same low-order N bits, where N is log(2) of the page size in bytes. Thus, the virtual address space and the physical address space may be divided into blocks of contiguous addresses, each virtual address providing a virtual page number, and each corresponding physical page number indicating the location within the memory 30 of a particular page 31 of data. The page table 20 in the physical memory 30 may contain the physical page numbers corresponding to all of the virtual page numbers of the virtual memory system, i.e. may contain the mappings between virtual page addresses and the corresponding physical page addresses, for all the virtual page addresses in the virtual address space. Typically, the page table 20 may contain a plurality of page table entries (PTEs) 21, each PTE 21 pointing to a page 31 in the physical memory 30 that corresponds to a particular virtual address.

Accessing the PTEs 21 stored in the page table 20 in the physical memory 30 may typically require memory bus transactions, which may be costly in terms of processor cycle time and power consumption. The number of memory bus transactions may be reduced by accessing the TLB 10, rather than the physical memory 30. The TLB 10 typically contains a subset of the virtual-to-physical address mappings that are stored in the page table 20. A plurality of TLB entries 12 may typically be contained in a TLB 10.

When an instruction has a virtual address 22 that needs to be translated into a corresponding physical address, during execution of a program, the TLB 10 may typically be accessed to look up the virtual address 22 among the TLB entries 12 stored in the TLB 10. The virtual address 22 may typically be contained within an address register. As shown in FIG. 1, each TLB entry 12 may have a tag field 14 and a data field 16. The tag field 14 may specify the virtual page number, and the data field 16 may indicate the physical page number corresponding to the tagged virtual page. If the TLB 10 finds, among its TLB entries, the particular physical page number corresponding to the virtual page number contained in the virtual address 22 presented to the TLB, a TLB "hit" occurs, and the physical page address can be retrieved from the data field 16 of the TLB 10. If the TLB 10 does not contain the particular physical page address corresponding to the virtual page number in the virtual address 22 presented to the TLB, a TLB "miss" occurs, and a lookup of the page table 20 in the physical memory 30 may have to be performed.

Figure 2:
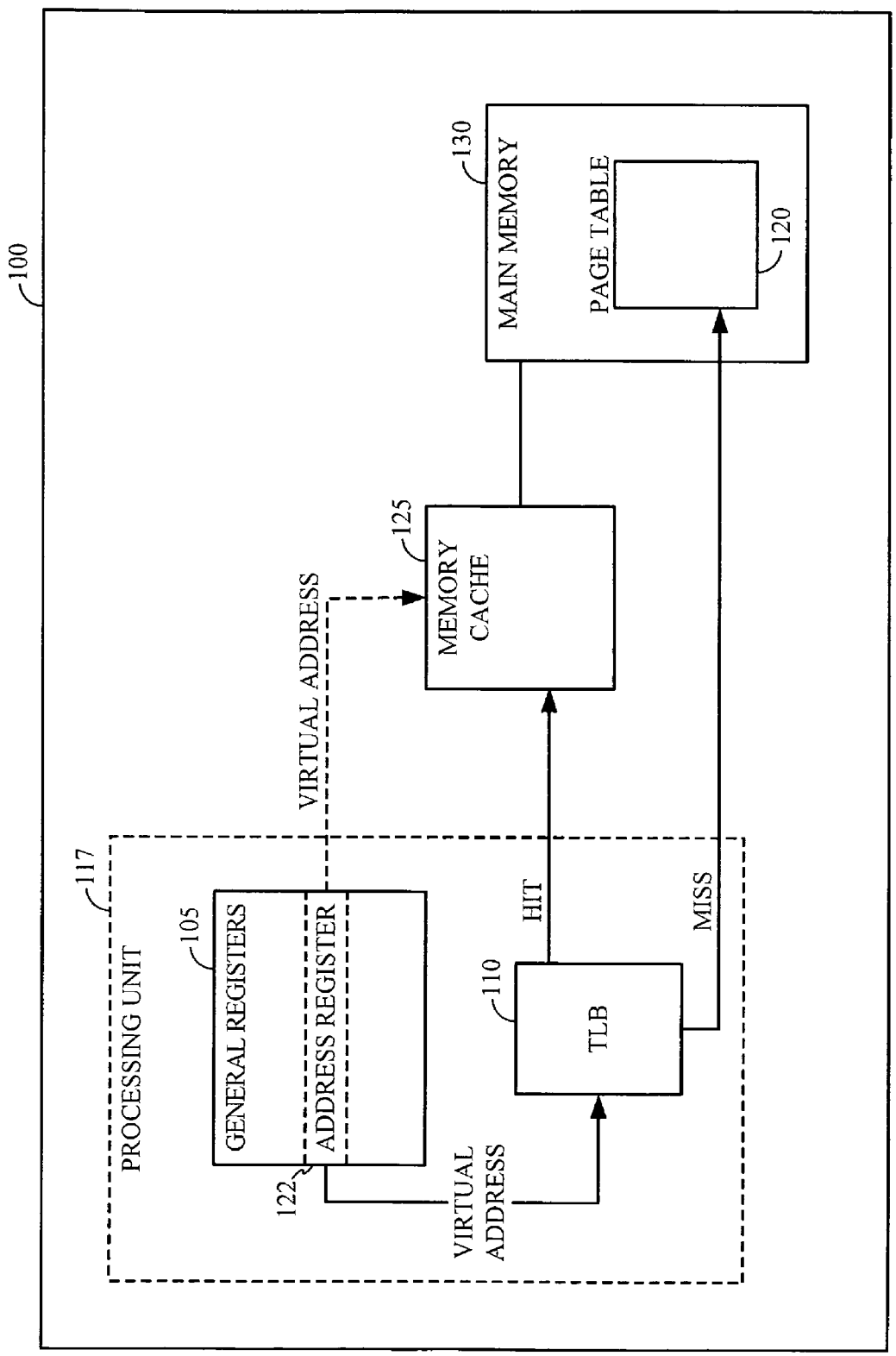
FIG. 2 illustrates one embodiment of a processing system.

FIG. 2 is a diagram of a processing system 100 that includes a set of general purpose registers 105, a TLB 110, a virtually tagged memory cache 125, and a main physical memory 130. The general purpose registers 105 may be contained within a CPU 117 in the processing system 100. In the illustrated embodiment, the TLB 110 is also shown as being located within the CPU 117, although in other embodiments the TLB 100 may be located within a separate memory management unit (MMU) (not shown), which may be located either outside or inside of the CPU. The memory 130 includes a page table 120, described in conjunction with FIG. 1.

The memory cache 125 is a small amount of fast memory that may be used to hold the data that are most frequently used by the processing system 100. Because of locality of reference, which may be an attribute of many computer programs, the memory cache 125 may effectively shorten the latency inherent in most memory accesses.

Memory caches generally work by selecting some number of candidate lines from the cache and comparing the address tags stored with each line to the desired memory address. If the candidate lines do not comprise all of the lines in the cache, then some method of selection is used, usually by using some bits of the physical or virtual address. If the selection method uses only bits of the virtual address, the cache is said to be "virtually indexed." If the method uses bits of the (translated) physical address, the cache is said to be "physically indexed." Also, the address tags stored with each cache line may be the virtual address or the physical address. Caches that use the physical address for either index or tagging must, of course, translate the virtual address into the physical address before it can be used. Virtually indexed, virtually tagged (VIVT) caches do not need to produce a physical address from a virtual one before accessing the cache and determining if the desired data is present. The memory cache 125 in the illustrated embodiment of the processing system 100 is a virtually tagged memory cache. It should be noted that in other embodiments of the processing system 100, memory caches may be used that are neither virtually tagged nor virtually indexed.

The set of registers 105 typically includes a plurality of address registers, one example of which is shown as address register 122. As explained earlier in conjunction with FIG. 1, the address register 122 may present a virtual address to the TLB 110, which may search within the plurality of its TLB entries, to find out whether any of its TLB entries have a tag that matches the virtual address presented by the address register 122. If the search results in a TLB hit, i.e. a TLB entry is found that contains the physical address corresponding to the virtual address in the address register 122, the memory cache 125 may be accessed, to locate the data having the physical address retrieved from the TLB 110. Most of the time, the data may typically be retrieved from the memory cache 125, although sometimes the data may not have been cached in the memory cache 125, and the main memory 130 may have to be accessed. The TLB 110 may be accessed before, or in parallel with, an access to the memory cache 125. The access to the virtually tagged memory cache 125 is functionally illustrated in FIG. 2 using a dashed arrow that sends out a virtual address from the address register 122 to the memory cache 125.

Figure 3A:
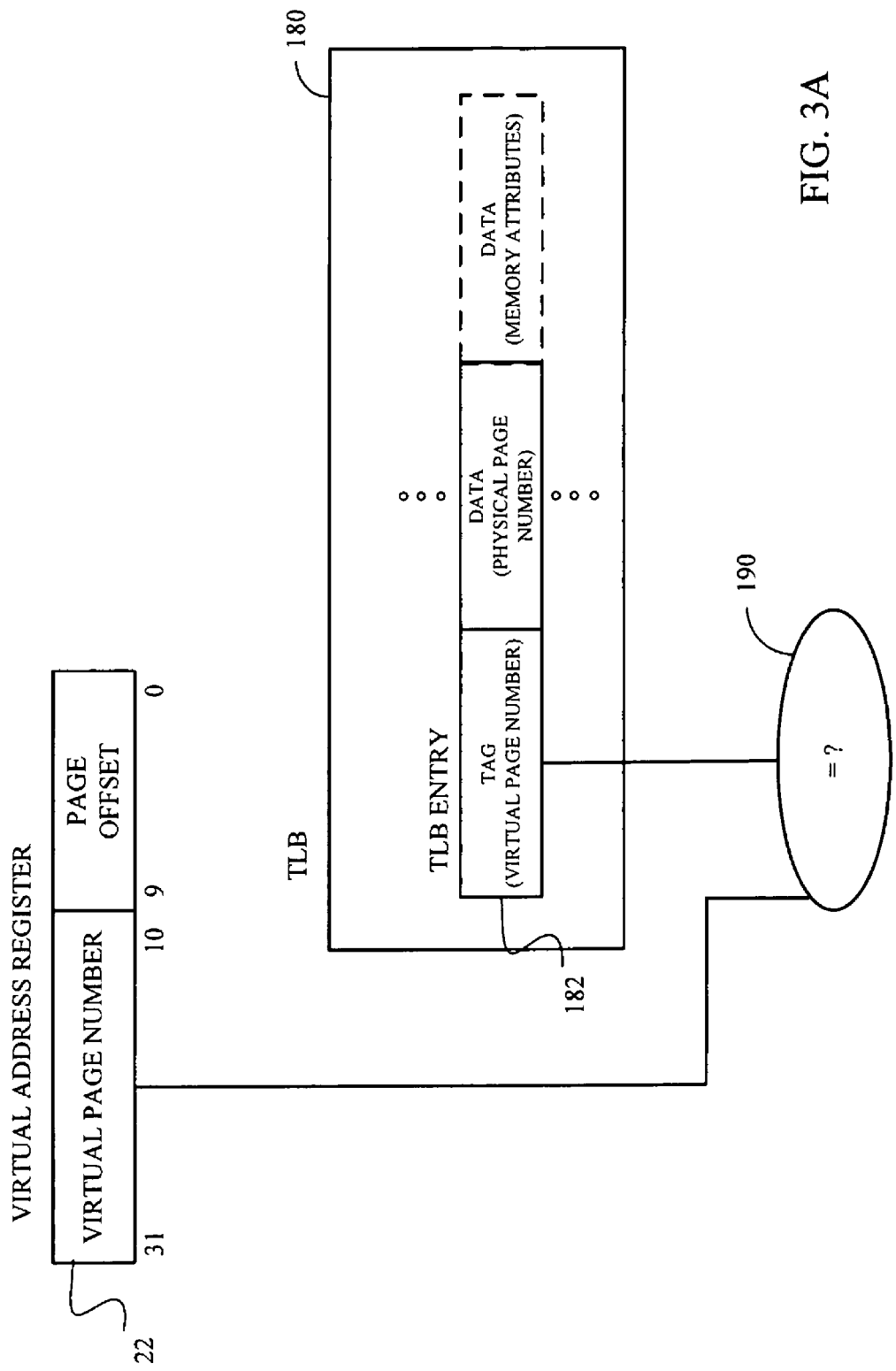
FIG. 3A illustrates a TLB having TLB entries that are configured to store one or more memory attributes.

FIG. 3A illustrates a TLB 180 and an exemplary virtual address register 22. The TLB 180 typically contains a number of rows or lines of TLB entries, an exemplary TLB entry being illustrated using reference numeral 182. The illustrated virtual address register 22 is a 32 bit register, although address registers may in general have a number of bits higher or lower than 32.

The address register 22 may include page offset information in its lowest order bits, and page number address information in its highest order bits. The page number specifies in which one of the plurality of pages in the main memory 30 the desired data is located. The page offset specifies where within the particular page (that is located at the page number specified in the higher order bits of the address register 22) the desired word or byte is located. The address register 22 may be a 32-bit register, in which the lowest order bits (bits 9 to 0 in this example) contain the page offset information; and the highest order bits, namely bits 31 to 10, contain the page number information. A comparator 190 may compare the tag fields of the TLB entries 182 with the virtual address shown in bits 0 to 11, to see whether the virtual address indicated by the tag field of any of the TLB entries 182 in the TLB 180 matches the virtual address indicated by the higher order bits in the address register 22. The page offset information may not need to be translated, because they are the same in both a virtual and a physical environment.

While a TLB is basically a cache of the virtual-to-physical address mappings of a processing system, in a TLB it may be customary to cache one or more memory attributes that are defined by physical region or page, in addition to address translation information. These memory attributes may include, for example, read, write, and execute permissions. The storing of one or more memory attributes in the TLB entry 182 is shown in FIG. 3A using dashed lines.

A TLB may have a multi-level structure (not shown), in which a relatively small TLB is used for most memory accesses, and back-up is provided by one or more larger higher-level TLB to be used when the first level TLB is missed. If misses occur successively in all of the higher level TLBs, the page table in the main memory may have to be accessed, i.e. the search for an address translation may continue until a valid translation entry is found.

Reducing the number of bits required to be cached in each TLB entry is desirable, since the more bits that have to be accessed, the slower the lookup in the TLB becomes, and the more power it consumes. In fact, if the number of bits required to be accessed from the TLB can be reduced to zero for some configurations, then the TLB could be removed, or at least not accessed frequently, potentially saving power, area, and complexity.

In a virtually indexed, virtually tagged memory cache, as shown in the processing system 100 in FIG. 2, a memory cache lookup may require no address translation unless the desired data is not found in the memory cache, i.e. a cache miss occurs. In this case, the only thing the TLB may conventionally be required to produce, for each memory cache lookup, may be the memory attributes required in order to execute the instruction accessing the memory, i.e. the read/write/execute permissions.

Figure 3B:
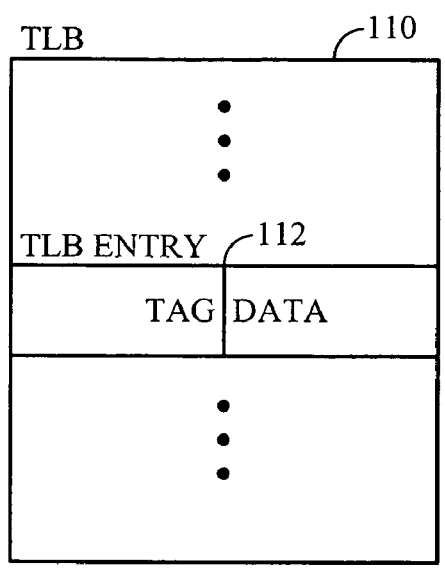
FIG. 3B illustrates a TLB entry configured to store only address translation information, and no memory attributes.

In one embodiment of a processing system, these memory attributes are not stored in a TLB but rather in an alternate location. FIG. 3B illustrates a TLB entry 112 in the TLB 110 used in the processing system 100 (shown in FIG. 2). As seen from FIG. 3B, the TLB entry 110 is configured to store only address translation information (in the TAG, and DATA fields) and no memory attributes.

Figure 4B:
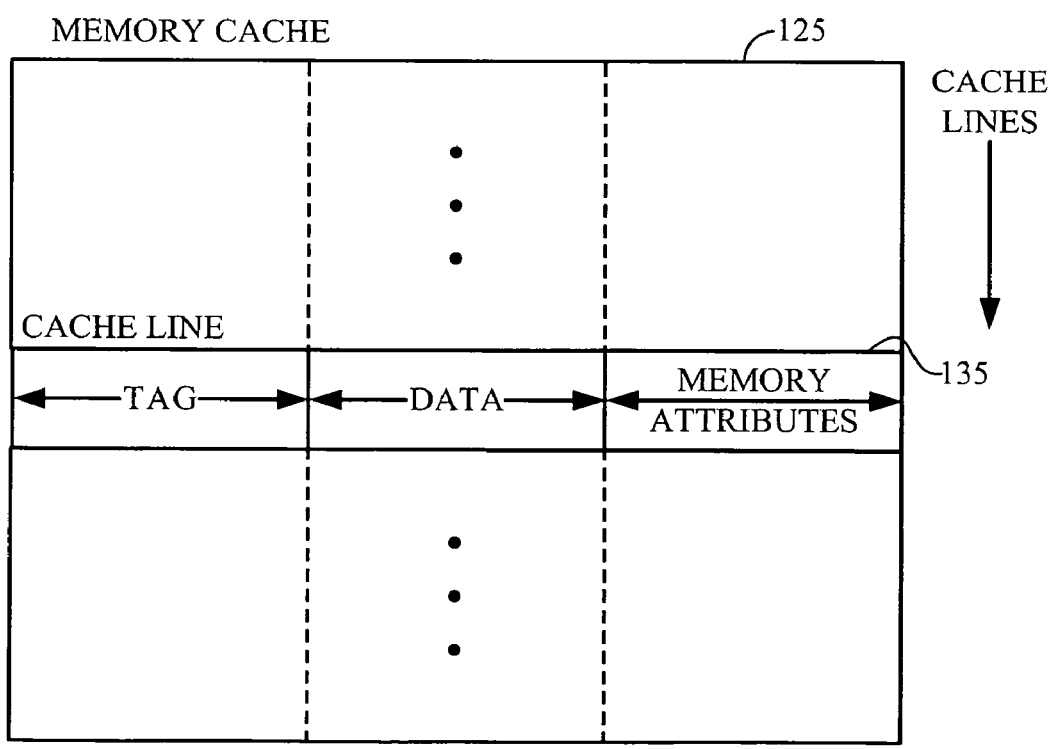
FIG. 4B illustrates a memory cache configured to store memory attributes as extra bits in its cache lines.
Figure 4A:
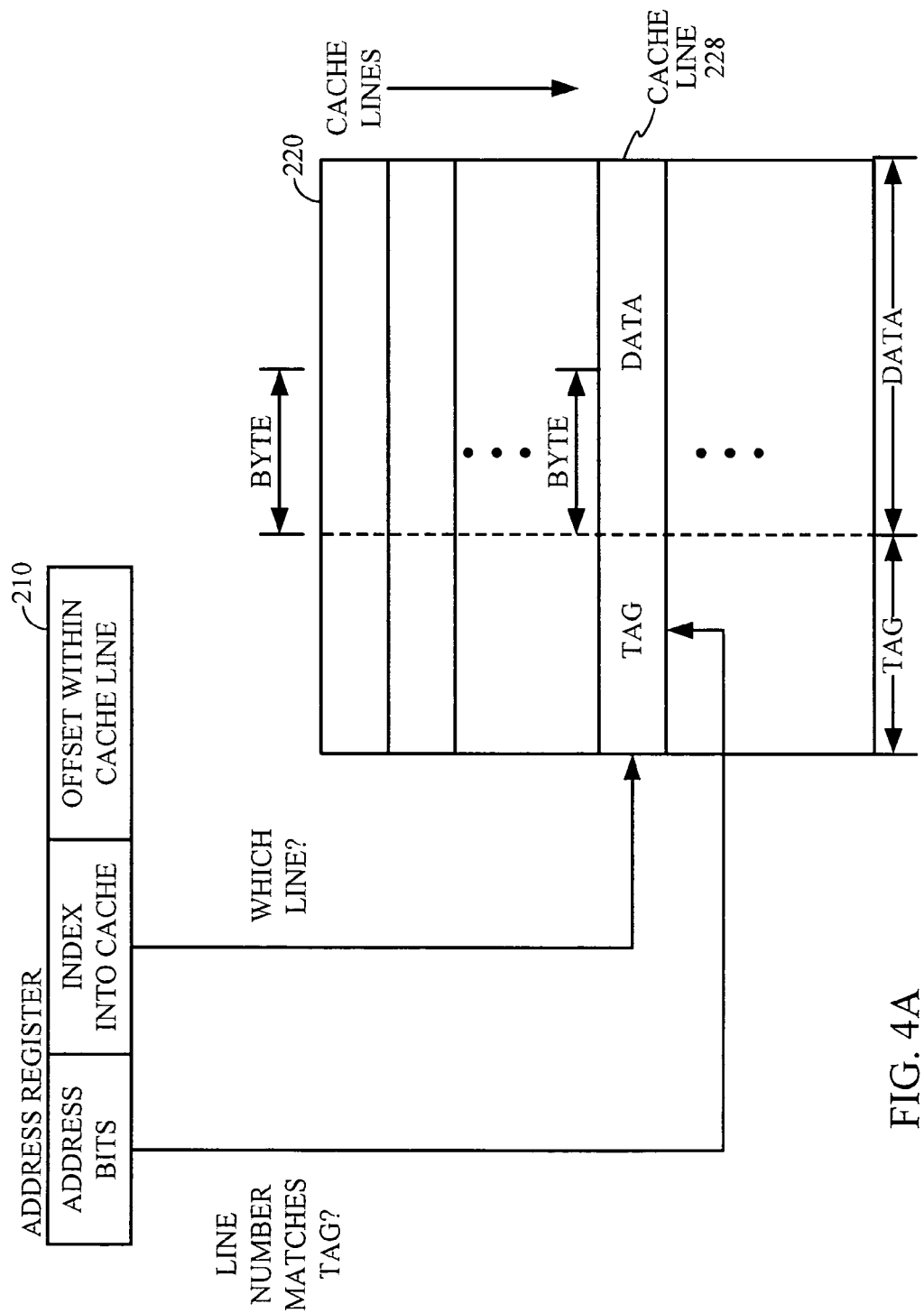
FIG. 4A illustrates cache access in a memory cache.

FIG. 4A schematically illustrates cache access in a memory cache 220. Memory caches may be divided into small segments called lines. Each cache line 228 in a memory cache typically contains an address tag indicating a memory address specifying a particular location within the main memory, and a copy of the data that is located in the main memory at the memory address contained in that cache line. The tagging and indexing procedure for the memory cache is similar to the tagging and indexing procedure for the TLB, since a TLB is basically a cache of address mappings.

The memory cache 220 may be configured to permit cache access using a virtual address. In other words, when a virtual address is presented to the cache 220, the cache 220 may be configured to allow a matching cache line to be identified from the plurality of cache lines. The matching cache line may be the cache line whose address tag indicates an address that matches the virtual address presented to the memory cache. The memory cache may be configured to permit one or more page attributes of a page located at the matching address to be retrieved from the memory cache, and not from the TLB. This may be done by storing in each cache line a page attribute of the page of data stored in the cache line, in addition to the address tag and the data.

As seen in FIG. 4A, the lowest order bits in an address register 210 presented to the memory cache 220 may contain information relating to the offset within a particular cache line 228. The offset information may be used to select a byte within a multi-byte cache line 228. For single-byte cache lines, no bits would need to be used for the offset. The next few bytes provide index information for selecting a particular cache line (or set of cache lines) within all the cache lines in the cache. Finally, the address bits in the tag portion of the cache line may be used to perform a tag-check against the tags of the cache lines 228 in the cache 220.

In a virtually tagged, virtually indexed cache, neither the tag nor the index have to be translated, and may operate concurrently with the TLB. In a virtually indexed, physically tagged cache, the virtual address in an address register may be used to access the line in the cache, and the physical address may be used for tagging. In the virtually indexed, physically tagged cache, the indexing may occur concurrently with the TLB or other memory management unit, but the output of the TLB (or other memory management unit) may be needed for the tag check.

In one embodiment of the processing system 100, the memory attributes are stored as extra bits in the cache lines of the memory cache. FIG. 4B schematically illustrates a memory cache 125, used in one embodiment of the processing system 100 (shown in FIG. 2). As seen in FIG. 4B, rather than storing the memory attributes in a TLB, they are stored in the memory cache by extending the cache lines to contain not only the address and the copy of the data, but also the attributes for each cache line. Each cache line 135 in FIG. 4B is configured to store one or more memory attributes as extra bits in the cache line.

These memory attributes may include permission criteria such as whether permission may be granted for carrying out an operation on the data, for example whether the data may be accessed to be read, or whether new data may be written onto extant data, or whether an instruction (e.g. ADD or MULTIPLY) may be executed using the extant data.

The memory attributes may also provide information regarding whether permission for an operation can be granted to a particular operating mode (e.g. a "supervisor" or privileged mode, contrasted with a "user" or non-privileged mode). In other words, the memory attributes may indicate whether user access is allowed for the data stored in that particular cache line, or whether only supervisor access is permitted. In addition to read/write/execute and user/supervisor mode permissions, the memory attributes may also provide other types of information, including but not limited to information relating to cacheability and write-allocation policy for other levels of cache between the memory cache mentioned and the actual system memory.

In a processing system having a virtually indexed, virtually tagged instruction cache, just by way of example, the CPU would only have to access a TLB in order to obtain read/write/execute permission attributes and compare them against the characteristics of the application that requested the instruction fetch. By placing a copy of those attributes in each cache line, the need for a TLB lookup on instruction fetches that generate a hit in the cache may be eliminated. A TLB lookup may be needed only to refill an instruction cache line by accessing the next level of memory, since the attributes would eventually have to be used in order to authorize the running application to execute the fetched instructions (and the translated address would be needed to access the physical memory).

It should be noted that the memory cache 220 is not limited to a virtually indexed virtually tagged instruction cache. Any memory cache that allows access via a virtual address may be used.

In sum, memory attributes described above are stored as extra bits in each line of a memory cache, and not stored in a TLB, obviating the need to retrieve those attributes from the TLB, at least at a first level. Avoiding the need to store these attributes in a TLB may result in lower overall system power, area, and/or complexity.

The previous description of the disclosed embodiments is provided to enable any person skilled in the art to make or use the processing system described above. Various modifications to these embodiments will be readily apparent to those skilled in the art, and the generic principles defined herein may be applied to other embodiments without departing from the spirit or scope of what has been described. Thus, the processing system is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processing system comprising:
    a memory configured to store data in a plurality of pages;
    a translation lookaside buffer (TLB); and
    a memory cache in communication with the TLB, the memory cache configured to:
        store first data that is stored at the memory;
        store a first page attribute associated with the first data; and
        permit retrieval of the first page attribute and the first data from the memory cache without accessing the TLB.

2. The processing system of claim 1, wherein each cache line of the memory cache is configured to store a corresponding virtual address tag.

3. The processing system of claim 1, wherein a first cache line of the memory cache is selectable by a virtual index.

4. The processing system of claim 1, wherein the first page attribute comprises a permission criterion indicative of whether a permission can be granted to carry out an operation on a first page of data.

5. The processing system of claim 4, wherein the operation comprises a read operation, a write operation, or an execute operation.

6. The processing system of claim 4, wherein the permission criterion is further indicative of whether the permission to carry out the operation can be granted when the processor is in a particular operating mode.

7. The processing system of claim 6, wherein the particular operating mode is one of a privileged mode and a non-privileged mode.

8. The processing system of claim 1, further comprising:
    a plurality of additional levels of memory cache, and wherein the first page attribute comprises a cacheability criterion that is indicative of whether data located at a physical address corresponding to a virtual address of a first cache line of the memory cache can be cached in one or more additional levels of memory cache.

9. The processing system of claim 1, wherein the data stored in at least one of the plurality of pages comprises one or more instructions.

10. The processing system of claim 1, wherein the memory includes a page table including a plurality of page table entries, and wherein each page table entry is configured to store a mapping between a virtual address and a physical address of a corresponding one of the plurality of pages.

11. A method comprising:
    retrieving from a memory cache that is in communication with a translation lookaside buffer (TLB) a first memory attribute that is associated with first data stored in the memory cache without accessing the TLB to retrieve the first memory attribute that is associated with the first data; and
    retrieving the first data from the memory cache.

12. The method of claim 11, further comprising accessing the memory cache using a virtual address associated with the first data.

13. The method of claim 11, wherein the memory cache further comprises a virtually indexed memory cache.

14. The method of claim 11, wherein the memory attribute comprises a permission to carry out an operation on the first data.

15. The method of claim 11, further comprising storing the memory attribute by including the memory attribute in a first cache line of the memory cache, wherein the first data is stored in the first cache line.

16. The method of claim 15, further comprising storing another memory attribute within the first cache line.

17. The method of claim 11, wherein the memory attribute is to provide information relating to a write-allocation policy associated with other levels of cache between the memory cache and a system memory.

18. The method of claim 11, wherein the memory cache comprises a virtually indexed, virtually tagged memory cache.

19. An apparatus comprising:
    means for accessing a memory cache using a virtual address of first data that is stored in the memory cache, wherein the memory cache also stores a memory attribute associated with the first data; and
    means for retrieving from the memory cache the memory attribute and the first data without accessing a translation lookaside buffer (TLB) of the apparatus to retrieve the memory attribute and the first data, wherein the memory cache is in communication with the TLB.

20. The apparatus of claim 19, wherein the memory attribute comprises a permission to carry out an operation on the first data.

21. The apparatus of claim 19, wherein the memory attribute comprises a read permission.

22. The apparatus of claim 19, wherein the memory attribute comprises a write permission.

23. The apparatus of claim 19, wherein the memory attribute comprises an execute permission.

24. The apparatus of claim 23, wherein the execute permission comprises permission to execute an add instruction.

25. The apparatus of claim 23, wherein the execute permission comprises permission to execute a multiply instruction.

26. The apparatus of claim 19, wherein the memory attribute is to provide information relating to a write-allocation policy associated with other levels of cache between the memory cache and a system memory.

\* \* \* \* \*